(12) United States Patent
Matsui et al.

(10) Patent No.: US 10,367,319 B2
(45) Date of Patent: Jul. 30, 2019

(54) TRUNK LINE STRUCTURE IN IN-VEHICLE NETWORK AND CONNECTOR FOR IN-VEHICLE NETWORK

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventors: Hajime Matsui, Mie (JP); Yasuo Omori, Mie (JP)

(73) Assignees: AutoNetworks Technologies, Ltd. (JP); Sumitomo Wiring Systems, Ltd. (JP); Sumitomo Electric Industries, Ltd. (JP)

( * ) Notice: Subject to any disclaimer, the term of this patent is extended or adjusted under 35 U.S.C. 154(b) by 124 days.

(21) Appl. No.: 15/529,144

(22) PCT Filed: Nov. 24, 2015

(86) PCT No.: PCT/JP2015/082849
§ 371 (c)(1),
(2) Date: May 24, 2017

(87) PCT Pub. No.: WO2016/098530
PCT Pub. Date: Jun. 23, 2016

(65) Prior Publication Data
US 2017/0264064 A1  Sep. 14, 2017

(30) Foreign Application Priority Data
Dec. 15, 2014 (JP) .................. 2014-252660

(51) Int. Cl.
*H01R 31/02* (2006.01)
*H01B 7/00* (2006.01)
*H01R 4/18* (2006.01)
*B60R 16/02* (2006.01)
(Continued)

(52) U.S. Cl.
CPC .......... *H01R 31/02* (2013.01); *B60R 16/0207* (2013.01); *H01B 7/0045* (2013.01);
(Continued)

(58) Field of Classification Search
CPC ....... H01L 37/0045; H01R 4/18; H01R 31/02; B60R 16/0207
See application file for complete search history.

(56) References Cited

U.S. PATENT DOCUMENTS 5,044,971 A * 9/1991 Hollingsworth ....... H01R 31/02
439/215
2015/0349471 A1* 12/2015 Maki .................. H01R 13/6691
307/10.1
(Continued)

FOREIGN PATENT DOCUMENTS

JP          2-46671       2/1990
JP       2002-260747      9/2002
(Continued)

OTHER PUBLICATIONS

International Search Report dated Feb. 9, 2016.

*Primary Examiner* — Timothy J Thompson
*Assistant Examiner* — Amol H Patel
(74) *Attorney, Agent, or Firm* — Gerald E. Hespos; Michael J. Porco; Matthew T. Hespos

(57) ABSTRACT

It is aimed to build a trunk line of an in-vehicle network having low connection resistance. The in-vehicle network is composed of a trunk line (1) and branch lines (2) branched from branch points (3) arranged at a plurality of intermediate positions of the trunk line (19 via connectors (CO) and to be connected to electronic control units (U). A bypass bypassed toward the connector (CO) from the trunk line (1) is formed at each branch point (3) of the branch line (1), and an exposed part of a core (7) is formed in this bypass and connected to a trunk line terminal (6). A branch line terminal
(Continued)

(8) connected to an end of the branch line (2) and the trunk line terminal (6) are connected inside the connector (CO).

5 Claims, 6 Drawing Sheets

(51) Int. Cl.
*H01R 4/02* (2006.01)
*B60R 16/023* (2006.01)
*H01R 43/28* (2006.01)

(52) U.S. Cl.
CPC .............. *H01R 4/021* (2013.01); *H01R 4/18* (2013.01); *H01R 4/185* (2013.01); *B60R 16/023* (2013.01); *H01R 43/28* (2013.01); *H01R 2201/26* (2013.01)

(56) References Cited

U.S. PATENT DOCUMENTS

| | | | |
|---|---|---|---|
| 2015/0360627 A1* | 12/2015 | Sasaki | B60R 16/0207 174/72 A |
| 2016/0149329 A1* | 5/2016 | Nakata | H01B 7/08 439/660 |

FOREIGN PATENT DOCUMENTS

| | | |
|---|---|---|
| JP | 2003-197305 | 7/2003 |
| JP | 2003-223950 | 8/2003 |
| JP | 2007-123135 | 5/2007 |
| JP | 2009-176688 | 8/2009 |

\* cited by examiner

TRUNK LINE STRUCTURE IN IN-VEHICLE NETWORK AND CONNECTOR FOR IN-VEHICLE NETWORK

BACKGROUND

1. Field of the Invention

The present invention relates to a trunk line structure in an in-vehicle network and a connector for in-vehicle network.

2. Description of the Related Art

Conventionally, an in-vehicle network called CAN is installed in an automotive vehicle and communication is conducted through a wiring harness in which a plurality of nodes (electronic control units) constitute communication transmission paths. Such a conventional in-vehicle network is known from Japanese Unexamined Patent Publication No. 2009-176688.

Generally, in the case of connecting a plurality of nodes, a connection method called a line-type (bus-type) connection method is known in CAN communication. The line type connection method connects each node via a plurality of branch lines branched from a trunk line.

In Japanese Unexamined Patent Publication No. 2009-176688, relay joint connectors are disposed at branch points where the respective branch lines are branched from the trunk line. A housing of the relay joint connector is formed with first and second fitting portions open in opposite directions, and busbars are arranged in two upper and lower stages inside. A plurality of tab-like terminals are formed to project side by side on each busbar.

On the other hand, each of the trunk line and the branch lines is formed of a twisted pair cable formed by twisting and combining two wires. The trunk line and the branch lines have a wire end at each branch point. A female terminal is connected to an end of each wire and connected to the corresponding tab-like terminal. In this way, it has been made possible to relay the trunk line and branch the branch lines.

In the case of the above structure, the trunk line is relayed at each connection point by way of the following many connected parts.

(i) Connected part of an end of the trunk line and the female terminal (ii) Connected part of the female terminal and the tab-like terminal (iii) Connected part of another tab-like terminal in the same busbar and another female terminal connected to another end of the trunk line (iv) Connected part of the other female terminal and the other end of the trunk line As just described, since many connection components are required and connection is made by way of many connected parts in the conventional structure, connection resistance may increase.

The present invention was completed based on the above situation and aims to provide a trunk line structure in an in-vehicle network capable of simplifying a structure for connecting trunk lines and reducing connection resistance and a connector suitably usable in an in-vehicle network.

SUMMARY

The invention is directed to a trunk line structure in an in-vehicle network in which plural electronic control units communicate with each other via a wiring harness. The wiring harness is composed of a trunk line and branch lines branched via connectors from branch points arranged at intermediate positions of the trunk line to be connected to the electronic control units. A part of the wiring harness constituting the trunk line is formed with bypasses bypassed toward the connectors from the trunk line at the branch points. A core of the wiring harness is exposed at the bypass and a trunk line terminal is connected to an exposed part of the core. A branch line terminal connected to an end of the branch line and the trunk line terminal are connectable inside the connector.

The invention also is directed to a connector for in-vehicle network to be interposed between a trunk line and a branch line in an in-vehicle network in which plural electronic control units communicate with each other via a wiring harness composed of the trunk line and the branch lines branched from branch points arranged intermediate positions of the trunk line. The wiring harness constituting the trunk line is formed with bypasses bypassed toward the connectors from the trunk line at the branch points. A core of the wiring harness is exposed at the bypass and a trunk line terminal is connected to an exposed part of the core. A branch line terminal is connected to an end of the branch line. A first accommodating portion for accommodating the trunk line terminal is formed to be open on one surface of a housing of the connector. A second accommodating portion for accommodating the branch line terminal is formed to be open on an opposite surface such that the both accommodating portions substantially coaxially face each other. First and second retainer mounting holes are open on the housing to communicate with the first and second accommodating portions. The trunk line terminal and the branch line terminal are retained and held in the housing only by the retainers mounted into the retainer mounting holes that lock the terminals.

Conventionally, a trunk line is cut between branch points and the branch points are connected using terminals. However, according to the trunk line structure of the present invention, the branch points in the trunk line can be connected without using terminals. Thus, terminal connected parts are reduced by that much, a trunk line connection structure can be simplified and connection resistance can also be reduced.

According to the connector for in-vehicle network of the present invention, the trunk line connection structure can be simplified, which can also contribute to a reduction of connection resistance. In addition, the trunk line terminal and the branch line terminal are locked only by the retainers in the connector of the present invention. That is, since the connector has no lance structure for locking the terminals, internal structures of the first and second accommodating portions can be simplified and, eventually, manufacturing cost can also be reduced due to the simplification of a mold structure.

The wiring harness of the trunk line structure in the in-vehicle network of the present invention may be formed of twisted pair cables. This configuration is effective in noise reduction.

The bypass may be folded continuously without interruption from the trunk line while forming a substantially U shape, and the exposed part of the core may be formed in a folded part and connected to the trunk line terminal. According to this configuration, the wiring harness is connected to the trunk line terminal while being kept continuous without cutting the wiring harness at the branch point of the trunk line. Thus, connection reliability can be enhanced.

The bypass may be folded from the trunk line while forming a substantially U shape and cut in a folded part. Additionally, the exposed part of the core may be formed at each of both cut end parts, and the exposed parts may be fastened and connected to the trunk line terminal. If no cut is made in the bypass, it is difficult to bend the wiring harness in connecting the wiring harness to the trunk line terminal. However, by cutting the folded part and fastening the cut end parts to the trunk line terminal as described above, a connecting operation to the trunk line terminal can be easily performed.

The exposed parts may be welded and connected to the trunk line terminal. According to this configuration, connection to the trunk line terminal is easy and connection reliability can be further enhanced.

Next, first and second specific embodiments of the present invention are described with reference to the drawings.

DETAILED DESCRIPTION

Figure 1:
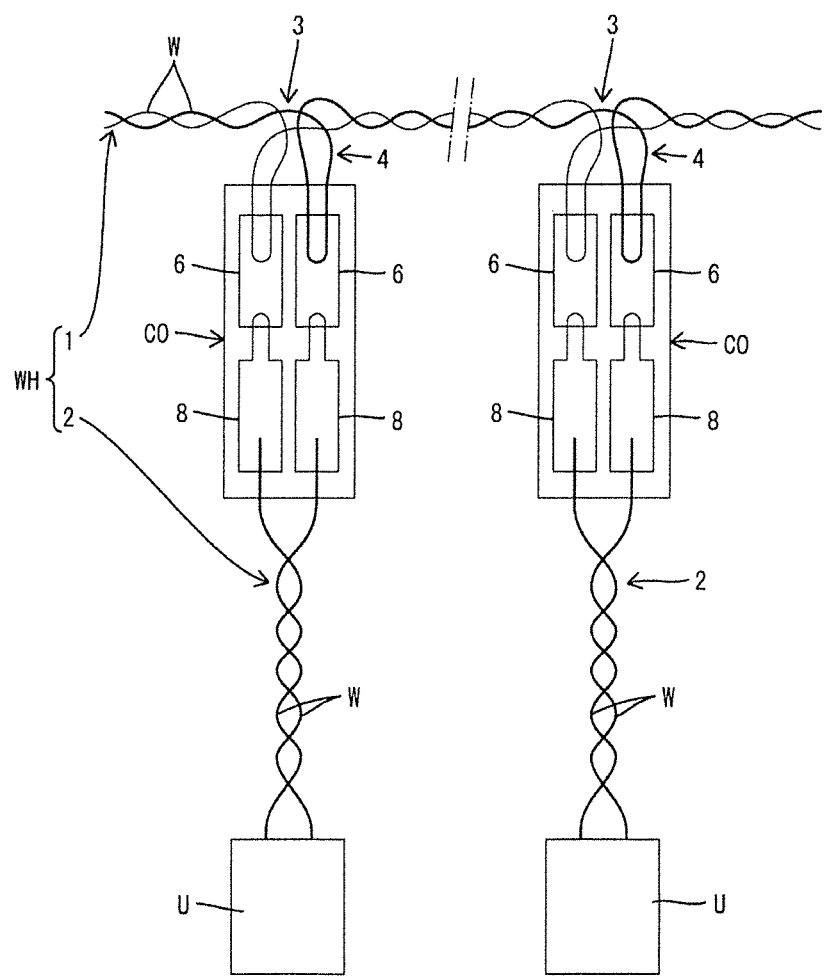
FIG. 1 is a view schematically showing a part of an in-vehicle network according to a first embodiment.

FIG. 1 shows a part of an in-vehicle network called CAN (Control Area Network), in which a plurality of electronic control units U can communicate with each other via a wiring harness WH.

The wiring harness WH is composed of a trunk line 1 and branch lines 2 branched from this trunk line 1 at a plurality of branch points 3 and connected to electronic control units U at branch destinations thereof. Further, the trunk line 1 and the respective branch lines 2 are each formed by a twisted pair cable formed by twisting two wires W (communication wires).

The trunk line 1 is formed with a bypass 4 toward a connector CO at each branch point 3, and the bypass 4 returns to the trunk line 1 again by way of a trunk line terminal 6 to be accommodated into a housing 5 of the connector CO. In the first embodiment, as shown in FIG. 6(A), a coating of the wire W is removed at a folded part of the bypass 4 to expose a core 7.

Figure 2:
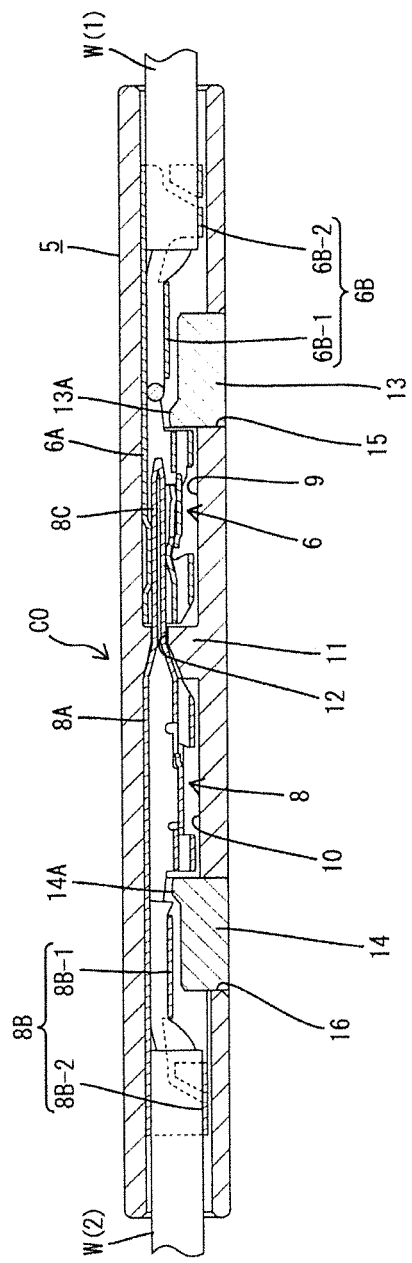
FIG. 2 is a side view in section of a connector.
Figure 6A:
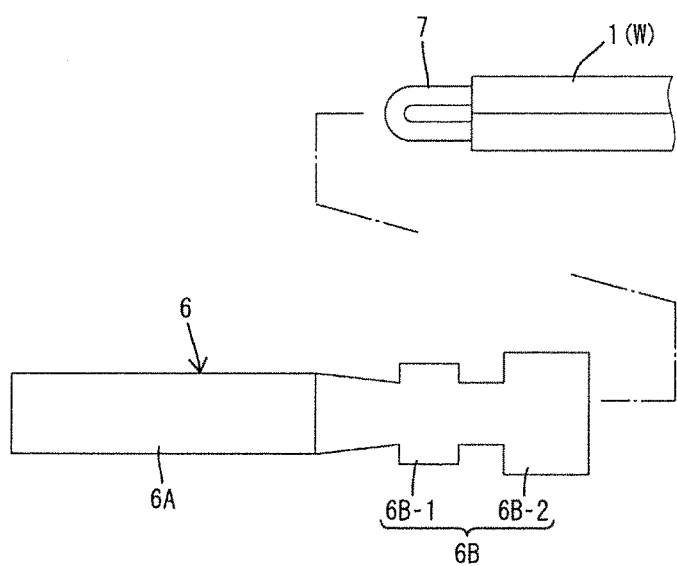
FIG. 6(A) is a plan view showing a state before the connection of a branch point of a trunk line and a trunk line terminal and FIG. 6(B) is a plan view showing a state after the connection.
Figure 6B:
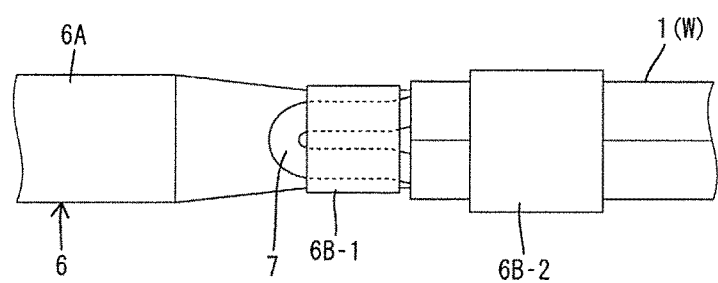

The trunk line terminal 6 is a female terminal as shown in FIGS. 2 and 6(A) and composed of a terminal connecting portion 6A to be connected to a branch line terminal 8 and a wire connecting portion 6B arranged behind terminal connecting portion 6A. The wire connecting portion 6B is composed of a wire barrel 6B-1 folded into a U-shape and to be collectively crimped and connected to the exposed core 7 and an insulation barrel 6B-2 to be collectively crimped and connected to a coating part of the folded wire W (see FIGS. 2 and 6(B)).

As described above, one end side of each wire W of the twisted pair cable constituting each branch line 2 is connected to the electronic control unit U and the other end side is connected to the branch line terminal 8. The branch line terminal 8 is a male terminal and composed of a terminal connecting portion 8A including a tab portion 8C connectable to the terminal connecting portion 6A of the trunk line terminal 6 and a wire connecting portion 8B arranged behind the terminal connecting portion 8A as shown in FIG. 2. Although not shown in detail, the wire connecting portion 8B is composed of a wire barrel 8B-1 to be crimped and connected to the core 7 exposed at an end part of each wire W of the twisted pair cable and an insulation barrel 8B-2 to be crimped and connected to a coating part of each wire W.

Figure 3:
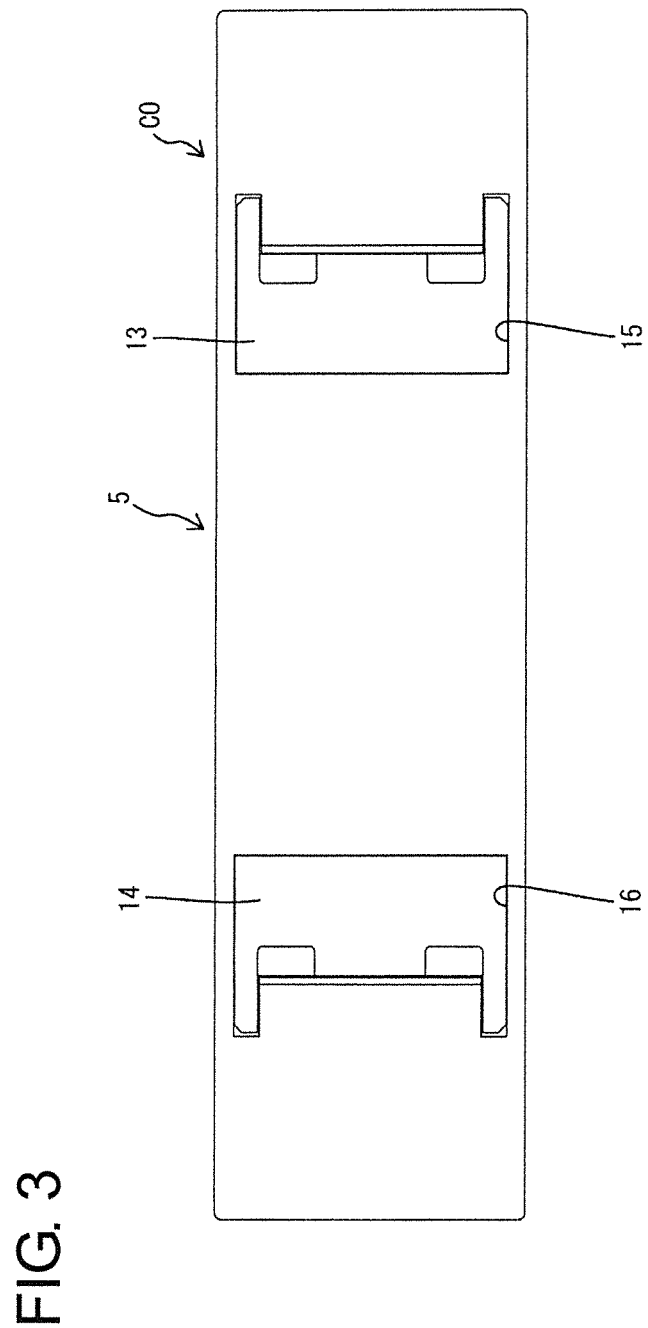
FIG. 3 is a bottom view of the connector.
Figure 4:
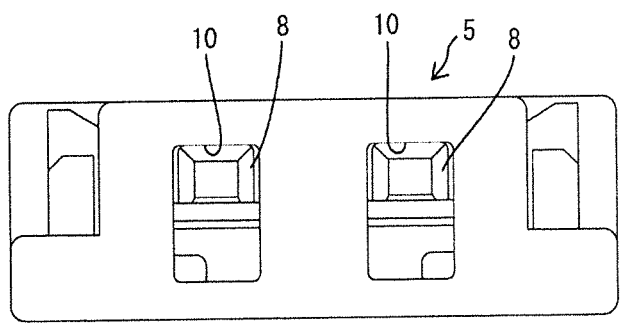
FIG. 4 is a left side view of the connector.
Figure 5:
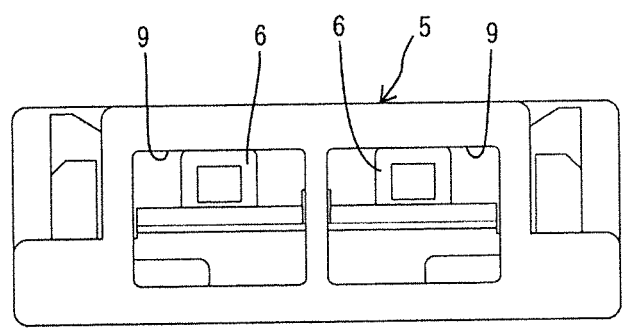
FIG. 5 is a right side view of the connector.

Next, the configuration of the connector CO is described with reference to FIGS. 2 to 5. The housing 5 of the connector CO is made of synthetic resin and shaped to be longer in a horizontal direction than in a vertical direction as shown in FIGS. 2 and 3. Further, two first accommodating portions 9 and two second accommodating portions 10 are provided laterally side by side in the housing 5 (see FIGS. 4 and 5). The first accommodating portion 9 is for accommodating the trunk line terminal 6 and the second accommodating portion 10 is for accommodating the branch line terminal 8.

As shown in FIG. 2, a partition wall 11 is provided between the first and second accommodating portions 9, 10 in a central part of the housing 5 in a longitudinal direction (horizontal direction). The first and second accommodating portions 9, 10 are substantially coaxially arranged across this partition wall 11. Surfaces of the partition wall 11 facing the first accommodating portions 9 and the second accommodating portions 10 respectively serve as front-stop surfaces configured to come into contact with the trunk line terminals 6 or the branch line terminals 8 to prevent any forward movements. Further, the partition wall 11 is formed with a pair of through holes 12 for allowing the tab portions 8C of the branch line terminals 8 to pass therethrough, thereby allowing the both first and second accommodating portions 9, 10 to communicate with each other.

Further, since the housing 5 cannot be formed with locking lances normally provided in the connector CO since the pairs of first and second accommodating portions 9, 10 are coaxially formed by removing molds in opposite directions. Any of the trunk line terminals 6 and the branch line terminals 8 is retained only by a retainer 13, 14. Specifically, as shown in FIG. 3, first and second retainer mounting holes 15, 16 are open on the lower surface of the housing 5. The both retainer mounting holes 15, 16 are respectively formed to collectively communicate with the pair of first accommodating portions 9 and the pair of second accommodating portions 10.

The first and second retainers 13, 14 are mounted into the both retainer mounting holes 15, 16. As shown in FIG. 2, the both retainers 13, 14 are formed with locking projections 13A, 14A capable of locking the respective terminal connecting portions 6A, 8A of the both trunk line terminals 6 and the both branch line terminals 8. Further, although not shown in detail, the both retainers 13, 14 are held at two positions, i.e. a partial locking position and a full locking position, with respect to the housing 5. When the both retainers 13, 14 are at the partial locking position, the respective locking projections 13A, 14A are located outside insertion areas for the trunk line terminals 6 and the branch line terminals 8 to permit the insertion and withdrawal of the respective terminals 6, 8. However, when the both retainers 13, 14 are at the full locking position (state shown in FIG. 2), the respective locking projections 13A, 14A are located in the insertion areas for the trunk line terminals 6 and the branch line terminals 8 and respectively lock the rear ends of the terminal connecting portions 6A of the trunk line terminals 6 or the terminal connecting portions 8A of the branch line terminals 8 to retain and hole these terminals 6, 8.

Next, functions and effects of the first embodiment are described. In the first embodiment, the bypass 4 is formed at each branch point 3 of the trunk line 1 and the core 7 is exposed in the folded part of the bypass 4 in configuring the trunk line 1. Then the wire barrel 6B-1 of the trunk line terminal 6 is crimped to this exposed part of the core 7. If the above operation is repeated at each branch point 3, the trunk line 1 can be configured.

As just described, the trunk line 1 can be continuous without interruption at each branch point 3 of the branch line 1 according to the first embodiment. Thus, terminals are not required unlike before, wherefore the structure of the trunk line 1 can be simplified and high connection reliability can be also realized.

Further, in the case of connecting each electronic control unit U branched from the trunk line 1 via the branch line 2, the aforementioned trunk line terminals 6 are respectively accommodated into the both first accommodating portions 9 of the connector CO with the first retainer 13 held at the partial locking position. If the first retainer 13 is moved to the full locking position thereafter, the locking projections 13A of the first retainer 13 lock the rear ends of the terminal connecting portions 6A of the trunk line terminals 6. Thus, the trunk line terminals 6 are retained and locked in the connector CO.

On the other hand, after being respectively connected to the end parts of the both wires W constituting the branch line 2, the branch line terminals 8 are accommodated into the second accommodating portions 10 of the connector CO. Also in this case, the second retainer 14 is held at the partial locking position. When the branch line terminals 8 are inserted to a proper depth position into the second accommodating portions 10, the tab portions 8C pass through the through holes 12 of the partition wall 11 and are inserted into the terminal connecting portions 6A of the trunk line terminals 6 to be electrically connected. If the second retainer 14 is moved to the full locking position thereafter, the locking projections 14A of the second retainer 14 lock the rear ends of the terminal connecting portions 8A of the branch line terminals 8. Thus, the branch line terminals 8 are retained and locked in the connector CO.

Since the housing 5 of the connector CO of the first embodiment is provided with the first and second accommodating portions 9, 10 coaxially facing each other as described above, no locking lance is formed in the housing 5. Since a locking lance is generally complicated in shape in many cases, having no such locking lance contributes to the simplification of the internal structure of the housing 5 as a result.

Figure 7A:
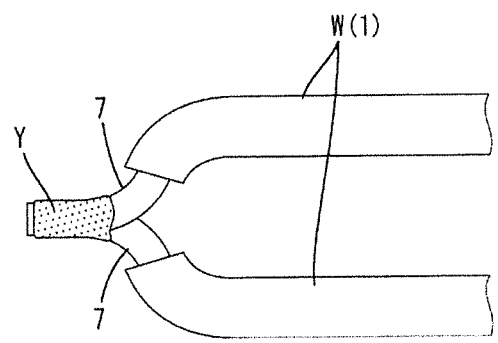
FIG. 7(A) is a plan view showing a state before the connection of a branch point of a trunk line and a trunk line terminal according to a second embodiment and FIG. 7(B) is a plan view showing a state after the connection.
Figure 7B:
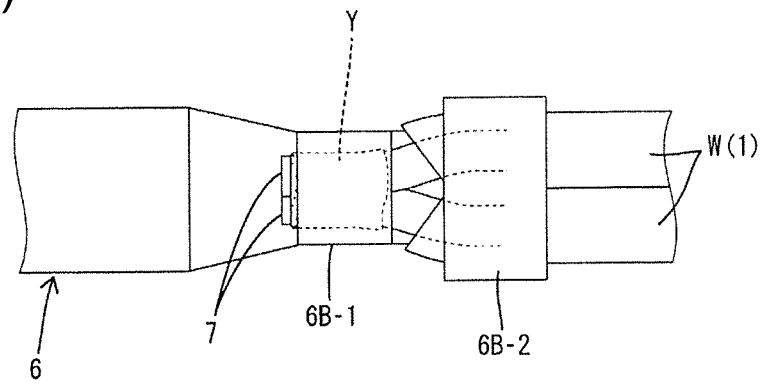

FIGS. 7(A) and 7(B) show a second embodiment of the present invention. In the first embodiment, the folded part of each bypass 4 of the trunk line 1 is continuously folded without interruption. However, the second embodiment is the same as the first embodiment in that a coating of a wire W is stripped over a predetermined range of a folded part, but differs from the first embodiment in that a core 7 is cut in the folded part. In this second embodiment, cut end parts of the core 7 are connected by welding after cutting. Thereafter, a wire barrel 6B-1 of a trunk line terminal 6 is crimped to a welded part Y.

In the second embodiment configured as described above, the following effects are obtained. Since the folded part of the bypass 4 is continuous in the first embodiment, a reaction force upon bending is large, it is not easy to fold the wire W in a close contact state and connection to the wire barrel 6B-1 tends to be difficult. In that respect, if the wire is cut in the folded part and, thereafter, the cut end parts are welded as in this embodiment, the wire W can be easily folded in a close contact state as shown in FIGS. 7(A) and 7(B). Thus, connection to the wire barrel 6B-1 also becomes easier. Further, since the cut end parts are connected by welding, high contact reliability is also obtained.

The other configuration is as in the first embodiment and, hence, similar functions and effects can be exhibited.

The present invention is not limited to the above described and illustrated embodiments. For example, the following embodiments are also included in the technical scope of the present invention.

Although both the trunk line 1 and the branch lines 2 are formed of the twisted pair cables in the above embodiments, there is no limitation to this.

Although both the trunk line terminals 6 and the branch line terminals 8 are present in one connector CO in the above embodiments, these terminals may be accommodated in different connectors CO and connected as the both connectors CO are connected.

Although the folded part of the wire W is cut in the bypass 4 of the trunk line 1 and, thereafter, the cut end parts are welded in the above second embodiment, two cut end parts may be both directly fastened to the wire barrel 6B-1 of the trunk line terminal 6 without being welded.

LIST OF REFERENCE SIGNS

1 . . . trunk line
2 . . . branch line
3 . . . branch point
4 . . . bypass
6 . . . trunk line terminal
8 . . . branch line terminal
9 . . . first accommodating portion
10 . . . second accommodating portion
13 . . . first retainer
14 . . . second retainer
U . . . electronic control unit
WH . . . wiring harness
CO . . . connector
W . . . wire

The invention claimed is:

1. A trunk line structure in an in-vehicle network in which a plurality of electronic control units communicate with each other via a wiring harness, wherein:
   the wiring harness is composed of a trunk line and branch lines branched via connectors from branch points arranged at a plurality of intermediate positions of the trunk line to be connected to the electronic control units;
   a part of the wiring harness constituting the trunk line is formed with bypasses bypassed toward the connectors from the trunk line at the branch points, and the bypass is continuously folded without interruption while forming a substantially U shape;
   a folded part of the bypass is formed with an exposed part of a core by having a coating of the wiring harness stripped, and a trunk line terminal is collectively crimped and connected to the exposed part of the folded core; and
   a branch line terminal connected to an end of the branch line and the trunk line terminal are connectable inside the connector.

2. The trunk line structure in an in-vehicle network of claim 1, wherein the wiring harness is formed of twisted pair cables.

3. The trunk line structure in an in-vehicle network of claim 1, wherein the trunk line terminal is collectively crimped to a coating part of the wiring harness folded in the folded part of the bypass.

4. A trunk line structure in an in-vehicle network in which a plurality of electronic control units communicate with each other via a wiring harness, wherein:
   the wiring harness is composed of a trunk line and branch lines branched via connectors from branch points arranged at a plurality of intermediate positions of the trunk line to be connected to the electronic control units;
   a part of the wiring harness constituting the trunk line is formed with bypasses bypassed toward the connectors from the trunk line at the branch points, a core of the wiring harness is exposed at the bypass and a trunk line terminal is connected to an exposed part of the core;
   a branch line terminal connected to an end of the branch line and the trunk line terminal are connectable inside the connector; and
   the bypass is formed by being folded from the trunk line while forming a substantially U shape, a folded part is cut, the exposed part of the core is formed at each of both cut end parts, and the both exposed parts are fastened welded and connected to the trunk line terminal.

5. A connector for in-vehicle network to be interposed between a trunk line and a branch line in an in-vehicle network in which a plurality of electronic control units communicate with each other via a wiring harness composed of the trunk line and the branch lines branched from branch points arranged at a plurality of intermediate positions of the trunk line, wherein:
   the wiring harness constituting the trunk line is formed with bypasses bypassed toward the connectors from the trunk line at the branch points, a core of the wiring harness is exposed at the bypass and a trunk line terminal is connected to an exposed part of the core, whereas a branch line terminal is connected to an end of the branch line; and
   a first accommodating portion for accommodating the trunk line terminal is formed to be open on one surface of a housing of the connector, a second accommodating portion for accommodating the branch line terminal is formed to be open on an opposite surface such that the both accommodating portions substantially coaxially face each other, first and second retainer mounting holes are open on the housing to communicate with the first and second accommodating portions, the trunk line terminal and the branch line terminal are retained and held in the housing only by the both retainers mounted into the both retainer mounting holes locking the both terminals.

* * * * *